United States Patent [19]

Rossetti

[11] Patent Number: 5,125,972
[45] Date of Patent: Jun. 30, 1992

[54] METHOD FOR THE FORMULATION AND PREPARATION OF HETEROCHROMATIC PAINTS AND RELATED PRODUCTS

[75] Inventor: Edoardo Rossetti, Modena, Italy

[73] Assignee: Rosetti S.p.A. Vernici E Idee, Modena, Italy

[21] Appl. No.: 269,761

[22] Filed: Nov. 10, 1988

Related U.S. Application Data

[63] Continuation-in-part of Ser. No. 10,956, Feb. 2, 1987, abandoned, which is a continuation of Ser. No. 743,636, Jun. 11, 1985, abandoned.

[30] Foreign Application Priority Data

Nov. 28, 1984 [IT] Italy ............................... 40108 A/84

[51] Int. Cl.⁵ ............................................. C09D 5/29
[52] U.S. Cl. .................................. 106/163.1; 524/55; 525/502; 525/171; 106/16; 106/158
[58] Field of Search ................... 523/502, 171; 524/55

[56] References Cited

U.S. PATENT DOCUMENTS

| Re. 26,242 | 8/1967 | Petty | 524/43 |
|---|---|---|---|
| 2,865,614 | 12/1958 | Nagy | 106/309 |
| 3,244,656 | 4/1966 | De Mejer | 106/14.12 |
| 3,547,849 | 12/1970 | Kennedy | 523/502 |
| 3,573,237 | 3/1971 | Zola | 106/170 |
| 3,725,089 | 4/1973 | Zola | 106/170 |
| 3,950,283 | 4/1976 | Sellers | 524/44 |
| 4,155,887 | 5/1979 | Hetson | 106/193 J |
| 4,282,131 | 8/1981 | Trousil | 524/449 |
| 4,376,654 | 3/1983 | Zola | 106/193 J |

FOREIGN PATENT DOCUMENTS

| 750605 | 6/1956 | United Kingdom . |
| 1224390 | 3/1971 | United Kingdom . |

Primary Examiner—William R. Dixon, Jr.
Assistant Examiner—Melissa Bonner
Attorney, Agent, or Firm—Lowe, Price, LeBlanc and Becker

[57] ABSTRACT

A method for the formulation and preparation of a heterochromatic paint comprises reacting one or more base mediums containing an anionic cellulose thickener in emulsion with an inorganic salt of a heavy or trivalent metal contained in a reactive medium emulsion. The heterochromatic paint comprises an emulsion containing non-soluble precipitated color particles, and each of the base mediums are of a different color. The inorganic salt is used in an amount sufficient to form dispersed phase reaction products contained in a dispersing phase emulsion and consisting essentially of a non-soluble precipitated color particles. The weight ratio of the dispersed phase to the dispersing phase in the heterochromatic paint is not greater than 0.4:1.

14 Claims, 3 Drawing Sheets

FIG. 5
FIG. 6
FIG. 7
FIG. 8

METHOD FOR THE FORMULATION AND PREPARATION OF HETEROCHROMATIC PAINTS AND RELATED PRODUCTS

The present application is a continuation-in-part of application Ser. No. 010,956 filed Feb. 2, 1987 which is a continuation of application Ser. No. 743,636 filed Jun. 11, 1985 both abandoned.

The invention relates to a method of formulating and preparing heterochromatic paints and other related products, and to a new process for the manufacture of general purpose multi-color paints such as are used in the construction, woodworking, plastics and mechanical engineering industries, and the like. The paints obtainable via such a process likewise constitute a portion of the present invention.

The prior art in this field embraces heterochromatic paints obtained by dissolving pigmented resins in a medium, or more precisely, by blending bases with an aqueous medium which will not effectively dissolve them. Blending such bases in emulsion together with dispersion media, one is able to produce suspensions of somewhat rough granulometry (max 2 mm), the state of which can be maintained constant so as to prevent mingling of the particles, whether in the container or during ultimate application to the surface. Thus it becomes possible to manufacture the multi-color paints in question.

While satisfactory insofar as one is provided with the facility of engineering polychrome effects, said paints present the drawback of containing flammable and harmful solvents. What is more, separation of the solvent and emulsion media is a physical process, and by definition, thermodynamically unstable; thus one has mingling of the colored particles, to the detriment of the polychrome effect, and stability cannot, in general, be ensured beyond 6 to 12 months. Furthermore, no possibility exists with such prior art paints of modifying the shape of the particles, the appearance of which is predominantly spherical, and as a result, somewhat limited in aesthetic potential, not to mention the fact that it is impossible to obtain spherical particles of a diameter noticeably greater than 2 mm.

Regarding manufacture, there are drawbacks connected with the stirring speed, which needs to be very slow and uniform in order to avoid excessive break-up of the pigments in suspension. The density both of the emulsion and of the bases must be identical to all intents and purposes, so as to avoid sedimentation, hence coalescence, of color particles. Viscosity of the paint must also be closely monitored to avoid the production of chromatic effects other than those initially intended. Again, the determining nature of numerous variable factors and the unstable nature of the suspension are instrumental in the production of numerous batches of paint which fail to match the effects of earlier batches of the same type. Lastly, wall-finishes obtained with solvent media insulate the wall surfaces to an unwarranted extent, whereas such surfaces should retain permeability so as to admit vapor and allow the wall to breathe. Finally, the cost of the raw materials for such paints is markedly high.

The prior art stands in need of improvement in view of the possibility of producing paints which afford a high polychromatic potential, a variety of visual effects, long-term stability, permeability, and greater economy. From the foregoing, one may discern the need for a solution to the problem posed by a search for polychrome paints offering greater economy and retaining permeability, wherein the suspended particles afford a greater variety of patterns and shapes (speckled, dropped or filiform, star or disc) and possess greater long-term stability (two or three years, and more) the characteristics of which can be reproduced exactly, even following a long time lapse.

The invention solves the problem thus outlined by adoption of a new method for the formulation of heterochromatic paints which eliminates the solvent medium, and renders long-term stability of the shape of particles feasible by chemical reaction.

The method consists in bringing about a reaction between an anionic cellulose thickener contained in emulsion base medium, and cationic salts of heavy or trivalent metals, emulsified in a reactive medium, the excess of the cationic salts being neutralized by calcium carbonate.

The method of formulating heterochromatic paints according to the invention envisages two components, the first of which being a "base medium", the second of which being a "reactive medium" split into two parts, A and B. The heterochromatic paint is produced by an appropriate blending of the two components, and, according to the ultimate manner of carrying the method into effect, stable heterochromatic emulsions are produced which, when applied, exhibit a mono- or polychrome ground with a random dispersion of color particles creating a speckled, dropped or filiform pattern, or appearing in a star, disc or other shape.

More particularly, the present invention comprises a method for the formulation and preparation of a heterochromatic paint comprising an emulsion containing non-soluble precipitated color particles. The method comprises reacting one or more base mediums containing an anionic cellulose thickener in emulsion with an inorganic salt of a heavy or trivalent metal contained in a reactive medium emulsion. Each of the base mediums is of a different color, and the inorganic salt is used in an amount sufficient to form reaction products contained in emulsion and consisting essentially of non-soluble precipitated color particles. The paint compositions prepared according to the present method comprise a dispersed phase constituted by the non-soluble precipitated particles, and a dispersing phase. According to the present method, the weight ratio of the dispersed phase to the dispersing phase in the resulting heterochromatic paint is not greater than 0.4:1. Preferably, the ratio of dispersed phase to the dispersing phase in the range of about 0.1:1 to 0.4:1.

Advantages of the invention are: rejection of the use of organic solvents, thereby eliminating toxic and inflammable properties, unpleasant or irritating odor, as well as a significant item of cost; use of lower cost raw materials; realization of finishes affording good vapor permeability; ample variety of random particle shapes, from smaller, finely granulated to coarser spherical, filiform, disc, star or other shapes, obtained with the extruders employed for admixing the bases; conservation of the shape of particles in suspension for ultra-long periods; and dependability and repeatability of the manufacturing process and the results thereof.

The invention will now be described in detail, by way of example, with the aid of three accompanying sheets of drawings which illustrate black-and-white reproductions of heterochromatic-type paint finishes formulated both with prior art methods, using a solvent medium.

FIGS. 5, 6, 7 and 8 are specimens of a dropped-type finish given by a heterochromatic paint formulated according to a second version B of the method disclosed.

Figure 3:
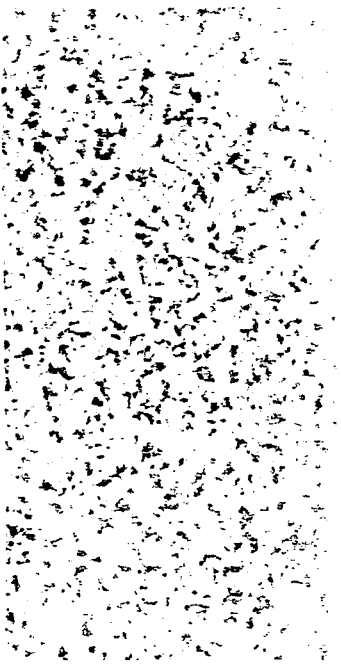
FIGS. 3 and 4 are specimens of a speckled-type finish given by a heterochromatic paint formulated according to a first version A of the method disclosed.

The method is carried into effect as follows.

The heterochromatic paint, a water paint, is obtained by appropriate blending of a base medium and a reactive medium. The following compositions are suitable for use in the present method.

| Formulation of the Base Medium (expressed in parts per hundred by weight and listed in admixing sequence) | |
|---|---|
| Sufficient water to reach 100 pp | |
| Bacteriocide | 0.010 to 0.400 |
| Ionic cellulose ether (e.g., Ionogenic, Na CMC) | 0.050 to 6.000 |
| Inorganic pigments } Organic pigments | 0.200 to 20.000 |
| Mica (optional) | 0.200 to 6.000 |
| Defoaming agent (optional) | 0.010 to 0.800 |
| Coalescent (optional) | 0.050 to 1.000 |
| Copolymer emulsion containing 50% dispersed solids | 1.000 to 20.000 |
| Corrosion inhibitor (optional) | 0.010 to 0.500 |
| Total pp | 100 |

| Formulation of the reactive medium (expressed in parts per hundred by weight and listed in admixing sequence) | |
|---|---|
| PART A | |
| Sufficient water to reach 100 | |
| Bacteriocide (optional) | 0.010 to 0.300 |
| Non-ionic cellulose ether (e.g., cellulose or polysaccharide alkyl or hydroxyalkyl) (optional) | 0.050 to 4.000 |
| PART B | |
| Water | 1.000 to 70.000 |
| Inorganic salt (of heavy or trivalent metal) | 1.000 to 30.000 |
| Total pp | 100 |

According to a preferred embodiment of the present method, the heterochromatic paints are prepared from n different colored base mediums. A suitable formulation is as follows:

| Formulation of the heterochromatic paint (expressed in part per hundred by weight and listed in admixing sequence) | |
|---|---|
| Reactive medium | 2.000 to 30.000 |
| Sufficient water to reach 100 | |
| base color 1 base color 2 base color 3 base color n | 40.000 to 75.000 |
| Micronized calcium carbonate | 0.100 to 6.000 |
| Defoaming agent (optional) | 0.050 to 0.500 |
| Coalescent (optional) | 0.050 to 1.000 |
| Copolymer emulsion containing 50% dispersed solids | 2.000 to 30.000 |
| Solution of bentonite (10% in water) | 0.100 to 5.000 |
| Non-ionic cellulose ether dissolved in 60% ethanol (e.g., cellulose alkyl or hydroxyalkyl, or polysaccharide hydroxyethers) | 0.050 to 4.000 |
| Bacteriocide | 0.010 to 0.400 |
| Solution of caustic soda (30% in water) | 0.050 to 3.000 |
| Corrosion inhibitor (e.g., alkyl hydroxyazine nitrobenzoate) | 0.010 to 0.600 |
| Total pp | 100 |

The following is an example of the composition resulting from the formulation of a heterochromatic paint according to the invention. (Components are expressed in part per hundred by weight)

| | |
|---|---|
| Sufficient water to reach 100 | |
| Bacteriocide | 0.014 to 0.790 |
| Non-ionic cellulose ether | 0.031 to 3.600 |
| Solution of inorganic salt (of heavy or trivalent metal) in water | 0.020 to 9.000 |
| Ionic cellulose ether | 0.020 to 4.500 |
| Inorganic pigments } Organic pigments | 0.080 to 15.000 |
| Mica | 0.080 to 4.500 |
| Micronized calcium carbonate | 0.100 to 6.000 |
| Defoaming agent | 0.054 to 1.100 |
| Coalescent | 0.070 to 1.750 |
| Copolymer emulsion containing 50% dispersed solids | 2.400 to 45.000 |
| Bentonite | 0.010 to 0.500 |
| Caustic soda | 0.015 to 0.900 |
| Corrosion inhibitor | 0.014 to 0.975 |
| Total pp | 100 |

First preferred base medium and reactive medium compositions for use in the method according to the present invention are as follows, in parts per hundred by weight:

| Base Medium | |
|---|---|
| Water | 56.600 |
| Bacteriocide | 0.200 |
| Ionic cellulose ether | 6.000 |
| Inorganic pigments and organic pigments | 10.000 |
| Mica | 6.000 |
| Defoaming agent | 0.400 |
| Coalescent | 0.500 |
| Copolymer emulsion containing 50% dispersed solids | 20.000 |
| Corrosion inhibitor | 0.300 |
| Total pp | 100 |

| Reactive medium | |
|---|---|
| PART A | |
| Water | 38.000 |
| Non-ionic cellulose ether | 2.000 |
| PART B | |
| Water | 30.000 |
| Inorganic salt of heavy or trivalent metal | 30.000 |
| Total pp | 100 |

The ratio of the dispersed phase to the dispersing phase in this first preferred embodiment of the heterochromatic paint according to the method of the present invention is about 0.393:1. These base medium and reactive medium compositions may be used to prepare a first preferred heterochromatic paint composition having the following composition in which the ratio of the dispersed phase to the dispersing phase is about 0.393:1.

| | |
|---|---|
| Reactive medium | 30.000 |
| Base medium color 1 | |
| Base medium color 2 | |
| Base medium color 3 | 60.000 |
| Base medium color n | |
| Micronized calcium carbonate | 2.000 |
| Defoaming agent | 0.200 |
| Coalescent | 0.500 |
| Copolymer emulsion containing 50% dispersed solids | 5.000 |
| Solution of bentonite (10% in water) | 0.500 |
| Non-ionic cellulose ether (60% in ethanol) | 0.400 |
| Bacteriocide | 0.200 |
| Solution of caustic soda (30% in water) | 1.000 |
| Corrosion inhibitor | 0.200 |
| Total pp | 100 |

In a second preferred embodiment of the present invention, the base medium and reactive medium compositions which are employed are as follows:

| Base Medium | |
|---|---|
| Water | 77.350 |
| Bacteriocide | 0.200 |
| Ionic cellulose ether | 0.050 |
| Inorganic pigments and organic pigments | 20.000 |
| Mica | 0.200 |
| Defoaming agent | 0.400 |
| Coalescent | 0.500 |
| Copolymer emulsion containing 50% dispersed solids | 1.000 |
| Corrosion inhibitor | 0.300 |
| Total pp | 100 |

| Reactive medium | |
|---|---|
| PART A | |
| Water | 68.000 |
| Non-ionic cellulose ether | 1.000 |
| PART B | |
| Water | 30.000 |
| Inorganic salt of heavy or trivalent metal | 1.000 |
| Total pp | 100 |

The ratio of the dispersed phase to the dispersing phase in this second preferred embodiment according to the present invention is about 0.094:1. A heterochromatic paint prepared according to the present method employing these second preferred base and reactive medium compositions has the following composition which exhibits a ratio of dispersed phase to dispersing phase of about 0.094:1.

| | |
|---|---|
| Water | 20.000 |
| Reactive medium | 30.000 |
| Base medium color 1 | |
| Base medium color 2 | |
| Base medium color 3 | 40.000 |
| Base medium color n | |
| Micronized calcium carbonate | 2.000 |
| Defoaming agent | 0.200 |
| Coalescent | 0.400 |
| Copolymer emulsion containing 50% dispersed solids | 5.000 |
| Solution of bentonite (10% in water) | 0.500 |
| Non-ionic cellulose ether (60% in ethanol) | 0.400 |
| Bacteriocide | 0.100 |
| Solution of caustic soda (30% in water) | 1.000 |
| Corrosion inhibitor | 0.200 |
| Total pp | 100 |

The method according to the invention is divided into three stages, the first two being preparation of one or more bases (i.e., two or more colors), and preparation of the reactive mediums and admixture of the base thereto. The third stage may be carried out in a number of ways (for example, version A, B or C) which will differ in terms of the admixture sequence or in the manner in which components are blended, thereby obtaining the polymorphous application typical of a heterochromatic paint according to the invention.

Method of Preparing the Base (Stage 1)

Bases are produced in given colors such as will obtain the desired multicolor effect. The base mixture is prepared utilizing the process currently adopted for blending water paints. Use is made of a vessel, together with a dispersion apparatus which maintains mixing and refines the entire bulk. The speed of rotation can be varied between, say, 0 and 2,000 min$^{-1}$. A rotary dispersion-paddle may be employed and should be adjustable as to height within the vessel. The apparatus also incorporates a rotor for dispersion of the pigments.

The base is formulated according to the sequence listed above. Admixture of the single components must be subject to complete solution or dispersion of the component previously introduced. The color in question can be obtained utilizing either organic or inorganic pigments, or suitably-proportioned combinations of the two, in order to achieve the tone, saturation and luminosity sought after.

When admixed to the reactive mediums, the base duly reacts with cations in the salts thereby forming non-soluble precipitates, a process which can be assisted by admixture to the base of an emulsion having similar polarity to the cellulose.

As set forth above, the ratio of dispersed phase to dispersing phase in the heterochromatic paint formed according to the method of the present invention is not greater than about 0.4:1. By so controlling the ratio of the dispersed phase to the dispersing phase, the heterochromatic paint formed according to the present invention is distinguishable from gel compositions and the like wherein the ratio of the dispersed phase to the dispersing phase is significantly greater. Additionally, according to the present invention, the base medium and the reactive medium react to form non-soluble precipitates which do not contain solvent and which are contained in an emulsion of the dispersed phase. In a preferred embodiment of the method according to the present invention, the ratio of dispersed phase to dispersing phase is in the range between about 0.1:1 and 0.4:1.

The components which form the non-soluble precipitates which constitute the dispersed phase include the inorganic salt of a heavy or trivalent metal contained in the reactive medium, the ionic cellulose ether contained in the base, the inorganic and organic pigments contained in the base, mica contained in the base and the copolymer emulsion of 50% dispersed solids contained in the base. It will be apparent that in order that the heterochromatic compositions prepared according to the present method exhibit a ratio of dispersed phase to dispersing phase in the preferred range of 0.1:1 to 0.4:1 when a lower quantity of base medium is employed in the paint compositions, it is necessary to use a higher quantity of pigments in the base mediums. For example, when the quantity of base mediums included in the paint compositions is near the lower limit of 40% as set forth above, the amount of pigments which are included in the base mediums should approach the higher limit of 20%.

Method of Preparing the Reactive Medium (Stage 2)

The reactive medium is prepared by way of the process currently utilized in the paint manufacturing industry. The non-ionogenic cellulose ether (alkyl or hydroxyalkyl of cellulose or polysaccharide) is dissolved in a plastic or stainless steel vessel. There is no special need to utilize a cellulose thickener in the reactive medium in order to render particles insoluble, though it is important that the cellulose thickener is added when seeking to control the shape of the particles, if degeneration into unwanted shapes is to be avoided.

Preparation of part A being under way, the cationic compound (e.g., an inorganic salt of heavy or trivalent metal) is prepared in a separate plastic or stainless steel vessel, and then added slowly to a part A which should be continually stirred. The reactive medium is formulated according to the sequence listed above.

Method of Preparing the Heterochromatic Paint (Stage 3)

Whatever the morphology of the heterochromatic paint in production, the method of its preparation comprises admixing the various color bases with the reactive medium in a stir-and-disperse apparatus consisting of a plastic or stainless steel vessel provided with a height-adjustable rotor, or with paddles located at various heights, whose speed of rotation is variable, for example between 0 and 2,000 min$^{-1}$. The admixing sequence for components must correspond to that listed above, and each single component must dissolve and/or blend and/or react fully before the following component is introduced.

Versions of the Method of Preparing Heterochromatic Paints

In stage 3 of the process, the polymorphous characteristics of the paint are determined. Different particle shapes are obtainable from the one method of formulation by admixing the base to the reactive medium in different manners, and stirring the medium at varying speeds and by different means.

Figure 4:
Figure 1:
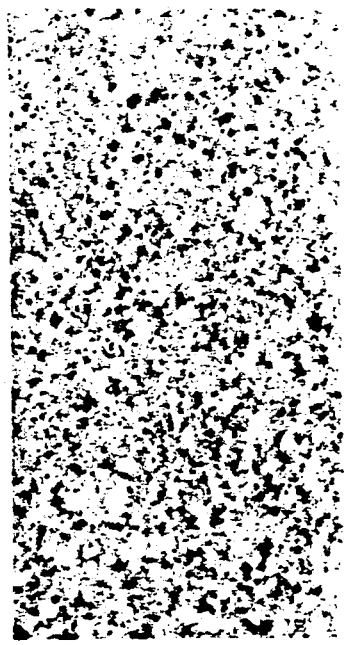
FIGS. 1 and 2 are specimens of a speckled-type finish given by a heterochromatic paint, formulated according to prior art methods, using a solvent medium.
Figure 2:
Figure 10:
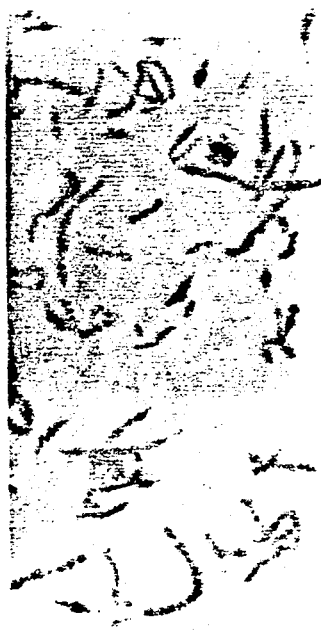
FIGS. 9, 10, 11 and 12 are specimens of a filiform-type finish given by a heterochromatic paint formulated according to a third version C of the method disclosed.
Figure 12:
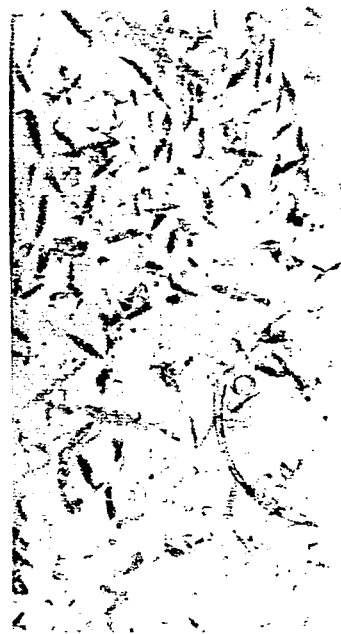

Adopting version A which provides a heterochromatic emulsion giving the speckled type of finish reproduced in FIGS. 3 and 4, the rotor must be capable of producing a significant level of dispersion, and may be, for example, of the Lenhard and Cowles type, or emulsifying, centrifugal, radial, biconical, trapezoidal, or the like.

After the reactive medium is poured into the vessel, the dispersion rotor is operated at 800 min$^{-1}$ or more whereupon base color 1 is admixed, by manual means or utilizing a pump, such as to react gradually with the inorganic salt and form nonsoluble precipitated particles whose size will diminish the longer the stirring action is continued, and/or the higher the speed of rotation becomes. The same procedure is adopted for other bases (color 2, color 3, = up to color n), in due proportion. By recording the pump flow rate and the speed of rotation, there will be no difficulty in repeating the manufacturing process in such a way as to obtain an identical morphology and color specification. Adopting version B which provides a heterochromatic emulsion of the dropped type of finish reproduced in FIGS. 5, 6, 7 and 8, the rotor must be of a design as to blend without occasioning dispersion, such as of the impeller type, having vanes either in V-formation or angled, or one of the various anchor types, auger-types, or turbine types having vertical and contoured blades, vertical radial blades, inclined radial blades, or the like. After pouring the reactive medium into the vessel, the rotor is made to turn at a low speed (40 to 80 min$^{-1}$), the exact setting of which will also depend upon the type of vanes. The rotor is adjusted so as to invest the mixture with as laminar a motion as possible, i.e., without any vortex occurring.

The bases are admixed in succession (colors 1, 2, 3 . . . , n), being extruded in solid and/or liquid state from nozzles of appropriate diameter (e.g., 2 to 4 mm) which may be immersed directly into the medium, or installed at surface level, or even marginally thereabove, say, 5 cm or more. In view of the fact that the morphology of particles held in suspension will depend upon the nozzle diameter and the speed of rotation, physical parameters such as these must be maintained constant if repeatability of the batch specification is to be ensured.

Figure 9:
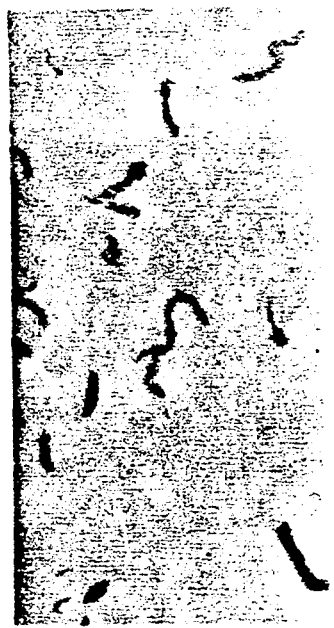
Figure 11:
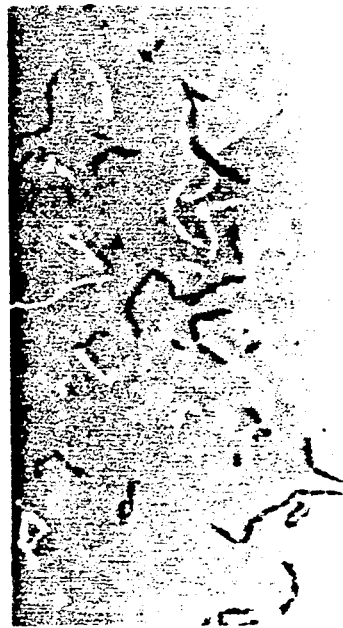

Adopting version C, one obtains the filiform type of multi-color finish reproduced in FIGS. 9, 10, 11 and 12. The paint providing the filiform finish of FIG. 9 is formulated from the heterochromatic components already described, while the paint providing the filiform finish of FIGS. 10 and 12, though formulated in the same manner, included different proportions; the quantity of color 1 (white) is reduced in favor of color 2 (blue) and color 3 (grey). The filiform particles are obtained by applying version B though utilizing nozzles of a much smaller diameter, say, 0.3 to 0.8 mm.

Before extruding the filiform particles, one can give the paint ground color a substantially uniform appearance (FIGS. 9-12) by proceeding as follows. After pouring the reactive medium into the vessel, a turbine is fitted to the blender shaft whose design is such as to produce a strong dispersive action (version A) with the rotor turning at maximum speed (at least 1,400 min$^{-1}$). Base color 1 is admixed, and the refining action is continued, thereby producing particles of such fineness that, applying the finish, a ground of uniform appearance can be obtained against which the random filiform splashes will stand out in contrast.

At this juncture, the high speed dispersion turbine must be replaced with a low speed blend-only rotor (version B). The random filiform particles are now obtained, following dispersion of color 1, by the admixture of color 2 and color 3, extruding the relative bases from small-diameter nozzles as aforementioned. The length of the filiform particles is determined by their viscosity and by the speed of reaction with the medium; their random diameter is dependent upon the diameter of the nozzle.

Thus, combining version A, B and C as described, together with other such "versions" which may be deduced in light of the foregoing, regarding the shape and diameter of nozzles or means of extrusion generally, and the colors of different bases, it becomes possible to obtain an infinite variety of patterns and chromatic effects.

The following formulations are those employed for the finishes illustrated in the drawings.

| Formulation of white base component - color 1 (FIGS. 4, 6, 9, 10 and 12) | |
|---|---|
| Water | 80.100 |
| Bacteriocide | 0.200 |
| Sodium carboxymethylcellulose | 1.000 |
| Inorganic pigment - titanium dioxide | 6.000 |
| Mica | 1.500 |
| Coalescent | 0.500 |
| Defoaming Agent | 0.400 |
| Copolymer - anionic vinyl-ethylene acetate with 50% dispersed solids | 10.000 |
| Corrosion inhibitor | 0.300 |
| Total pp | 100 |

| Formulation of blue base component - color 2 (FIGS. 4, 6, 9, 10 and 12) | |
|---|---|
| Water | 80.100 |
| Bacteriocide | 0.200 |
| Sodium carboxymethylcellulose | 1.000 |
| Inorganic pigment - titanium dioxide | 5.800 |
| Organic pigment - phthalocyanine blue | 0.200 |
| Mica | 1.500 |
| Coalescent | 0.500 |
| Defoaming Agent | 0.400 |
| Copolymer - anionic vinyl-ethylene acetate with 50% dispersed solids | 10.000 |
| Corrosion inhibitor | 0.300 |
| Total pp | 100 |

| Formulation of grey base component - color 3 (FIGS. 4, 6, 9, 10 and 12) | |
|---|---|
| Water | 80.000 |
| Bacteriocide | 0.200 |
| Sodium carboxymethylcellulose | 1.000 |
| Inorganic pigment - titanium dioxide | 5.000 |
| Inorganic pigment - yellow ferrous oxide | 0.100 |
| Inorganic pigment - black ferrous oxide | 1.000 |
| Mica | 1.500 |
| Coalescent | 0.500 |
| Defoaming Agent | 0.400 |
| Copolymer - anionic vinyl-ethylene acetate with 50% dispersed solids | 10.000 |
| Corrosion inhibitor | 0.300 |
| Total pp | 100 |

| Formulation of reactive medium (FIGS. 4, 6, 9, 10 and 12) | |
|---|---|
| Part A | |
| Water | 59.400 |
| Polygalactomannan hydroxyalkyl | 0.600 |
| Part B | |
| Water | 30.000 |
| Aluminum sulphate - $Al_2(SO_4)_3$ | 10.000 |
| Total pp | 100 |

| Formulation of heterochromatic paint (FIGS. 4, 6, 9, 10 and 12) | |
|---|---|
| Reactive medium | 10.000 |
| White base medium - color 1 | 60.000 |
| Blue base medium - color 2 | 6.600 |
| Grey base medium - color 3 | 5.000 |
| Micronized calcium carbonate | 3.000 |
| Defoaming agent | 0.200 |
| Coalescent | 0.500 |
| Copolymer - styrene acrylic containing 50% dispersed solids | 12.000 |
| Solution of bentonite - 10% in water | 0.800 |
| Solution of polygalactomannan hydroxyalkyl - 60% in ethanol | 0.400 |
| Bacteriocide | 0.200 |
| Solution of caustic soda - 30% in water | 1.000 |
| Corrosion inhibitor | 0.300 |
| Total pp | 100 |

In this heterochromatic paint formulation, the dispersed phase comprises the following components:

| | |
|---|---|
| Inorganic salt ($Al_2(SO_4)_3$) | 1.000% |
| Ionic cellulose ether (sodium carboxymethyl cellulose) | 0.716% |
| Inorganic and organic pigments | 4.301% |
| Mica | 1.074% |
| Solids contained in copolymer emulsion | 7.160% |
| Total | 14.251% |

Thus, the ratio of dispersed phase to dispersing phase of this composition was 14.251:85.749, corresponding to 0.166:1.

FIGS. 5, 7, 8 and 11 show further examples of paint finishes according different color combinations, obtained with heterochromatic emulsions according to the invention. When carrying the invention into effect, materials or details may differ from those described, but are technically equivalent and by no means straying from within the bounds of the present invention. The following variation might be applied in the case of the speckled multi-color finish illustrated in FIGS. 3 and 4, bearing in mind that variations of this nature fall within the scope of the method and the different versions of its implementation disclosed herein.

Formulation of the bases and of the reactive medium remain unaltered. Stage 3 on the other hand, in which formulation of the heterochromatic paint is brought about, remains substantially unaltered in terms of total quantities introduced, though the sequence of admixing single components is modified.

| Variation on the formulation of a heterochromatic paint (as in FIG. 4) | |
|---|---|
| Base - color 1 | 60.000 |
| Reactive medium | 5.000 |
| Calcium carbonate | 1.500 |
| Base - color 2 | 6.600 |
| Reactive medium | 3.000 |
| Calcium carbonate | 0.500 |
| Base - color 3 | 5.000 |
| Reactive medium | 2.000 |
| Calcium carbonate | 1.000 |
| Defoaming agent | 0.200 |
| Coalescent | 0.500 |
| Copolymer - styrene acrylic containing 50% dispersed solids | 12.000 |
| Solution of bentonite - 10% in water | 0.800 |
| Solution of polygalactomannan hydroxyalkyl - 60% in ethanol | 0.400 |
| Bacteriocide | 0.200 |
| Solution of caustic soda - 30% in water | 1.000 |
| Corrosion inhibitor | 0.300 |
| Total pp | 100 |

The variation thus formulated (version D) is carried into effect as follows. Base color 1 is poured into a plastic or stainless steel vessel, care being taken to fit the blender with a turbine designed to provide a strong dispersive action. The rotor is turned at 800 min$^{-1}$ or more, and introduction of the reactive medium commenced. As the medium gradually comes into contact with the base, a reaction takes place which produces the finely divided nonsoluble, precipitated particles. Granulometry being obtained as required, the rotor speed is duly reduced, whereupon the reaction is neutralized by admixture of the calcium carbonate. Base color 2 is then added, the rotor speed once again increased, and the reactive medium introduced. Having obtained the requisite granulometry, the rotor speed is lowered, whereupon the reaction is neutralized by admixture of the calcium carbonate.

This cycle is duly repeated for each base utilized. With the granulated color particles formed, the paint is integrated by admixture of the remaining components listed. Although the description up to this point has assumed it a fundamental aspect of the method to adopt an anionic cellulose thickener which will react with the cationic salts of heavy or trivalent metals, in emulsion, it will be observed that the possibility exists where necessary of promoting reaction between a cationic thickener and anionic surface-active agents or trivalent anions, thereby obtaining non-emulsifiables.

As far as regards the sequence of admixture in each formulation disclosed, this happens to be the most convenient in each case. Heterochromatic paints are obtainable nonetheless implementing changes in the sequence that remain compatible with the method.

What is claimed is:

1. An aqueous-based heterochromatic paint, comprising an emulsion containing non-soluble precipitated color particles which are formed in the reaction of one or more base mediums containing an anionic cellulose thickener in emulsion, each of said base mediums being of a different color, with an inorganic salt of a heavy or trivalent metal contained in a reactive medium emulsion, said reactive medium emulsion further including a non-ionic cellulose ether, said inorganic salt being used in an amount sufficient to form dispersed phase products contained in a dispersing phase emulsion and consisting essentially of non-soluble precipitated color particles, said reaction being conducted in the presence of micronized calcium carbonate, and the weight ratio of the dispersed phase to the dispersing phase in the heterochromatic paint being not greater than 0.4:1.

2. A heterochromatic paint as defined in claim 1, wherein the paint includes n different colored base mediums and is formulated from the following components in parts per hundred by weight:

| | |
|---|---|
| Reactive medium emulsion | 2.000 to 30.000 |
| Sufficient water to reach 100 parts | |
| Base medium color 1 | |
| Base medium color 2 | 40.000 to 75.000 |
| Base medium color 3 | |
| Base medium color n | |
| Micronized calcium carbonate | 0.100 to 6.000 |
| Defoaming agent | 0.050 to 0.500 |
| Coalescent | 0.050 to 1.000 |
| Copolymer emulsion containing 50% dispersed solids | 2.000 to 30.000 |
| Solution of bentonite (10% in water) | 0.100 to 5.000 |
| Non-ionic cellulose ether (60% in ethanol) | 0.050 to 4.000 |
| Bacteriocide | 0.010 to 0.400 |
| Solution of caustic soda (30% in water) | 0.050 to 3.000 |
| Corrosion inhibitor | 0.010 to 0.600 |
| Total pp | 100 |

3. A heterochromatic paint as defined in claim 1, wherein the paint includes n different colored base mediums and is formulated from the following components in parts per hundred by weight:

| | |
|---|---|
| Reactive medium emulsion | 30.000 |
| Base medium color 1 | |
| Base medium color 2 | 60.000 |
| Base medium color 3 | |
| Base medium color n | |
| Micronized calcium carbonate | 2.000 |
| Defoaming agent | 0.200 |
| Coalescent | 0.500 |
| Copolymer emulsion containing 50% dispersed solids | 5.000 |
| Solution of bentonite (10% in water) | 0.500 |
| Non-ionic cellulose ether (60% in ethanol) | 0.400 |
| Bacteriocide | 0.200 |
| Solution of caustic soda (30% in water) | 1.000 |
| Corrosion inhibitor | 0.200 |
| Total pp | 100 | the weight ratio of the dispersed phase to the dispersing phase being 0.393:1.

4. A heterochromatic paint as defined in claim 1, wherein the paint includes n different colored base mediums and is formulated from the following components in parts per hundred by weight:

| | |
|---|---|
| Water | 20.00 |
| Reactive medium emulsion | 30.000 |
| Base medium color 1 | 40.000 |
| Base medium color 2 | |
| Base medium color 3 | |
| Base medium color n | |
| Micronized calcium carbonate | 2.000 |
| Defoaming agent | 0.200 |
| Coalescent | 0.400 |
| Copolymer emulsion containing 50% dispersed solids | 5.000 |
| Solution of bentonite (10% in water) | 0.500 |
| Non-ionic cellulose ether (60% in ethanol) | 0.400 |
| Bacteriocide | 0.100 |
| Solution of caustic soda (30% in water) | 1.000 |
| Corrosion inhibitor | 0.200 |
| Total pp | 100 | the weight ratio of the dispersed phase to the dispersing phase being about 0.094:1.

5. A heterochromatic paint as defined in claim 1, wherein the paint is formulated from the following components in parts per hundred by weight:

| | |
|---|---|
| Reactive medium emulsion | 10.000 |
| White base medium - color 1 | 60.000 |
| Blue base medium - color 2 | 6.600 |
| Grey base medium - color 3 | 5.000 |
| Micronized calcium carbonate | 3.000 |
| Defoaming agent | 0.200 |
| Coalescent | 0.500 |
| Copolymer - styrene acrylic containing 50% dispersed solids | 12.000 |
| Solution of bentonite - 10% in water | 0.800 |
| Solution of polygalactomannan hydroxyalkyl - 60% in ethanol | 0.400 |
| Bacteriocide | 0.200 |
| Solution of caustic soda - 30% in water | 1.000 |
| Corrosion inhibitor | 0.300 |
| Total pp | 100 | the weight ratio of the dispersed phase to the dispersing phase being about 0.166:1.

6. A method for the formulation and preparation of an aqueous-based heterochromatic paint which comprises an emulsion containing non-soluble precipitated color particles, which method comprises reacting one or more base mediums containing an anionic cellulose thickener in emulsion, each of said base mediums being of a different color, with an inorganic salt of a heavy or trivalent metal contained in a reactive medium emulsion, said reactive medium emulsion further including a non-ionic cellulose ether, said inorganic salt being used in an amount sufficient to form dispersed phase reaction products contained in a dispersing phase emulsion and consisting essentially of non-soluble precipitated color particles, the weight ratio of the dispersed phase to the dispersing phase in the resultant heterochromatic paint being not greater than 0.4:1, and wherein the paint includes n different colored base mediums and is formulated from the following components in parts per hundred by weight:

| | |
|---|---|
| Reactive medium emulsion | 2.000 to 30.000 |
| Sufficient water to reach 100 parts | |
| Base medium color 1 | |
| Base medium color 2 | 40.000 to 75.000 |
| Base medium color 3 | |
| Base medium color n | |
| Micronized calcium carbonate | 0.100 to 6.000 |
| Defoaming agent | 0.050 to 0.500 |
| Coalescent | 0.050 to 1.000 |
| Copolymer emulsion containing 50% dispersed solids | 2.000 to 30.000 |
| Solution of bentonite (10% in water) | 0.100 to 5.000 |
| Non-ionic cellulose ether (60% in ethanol) | 0.050 to 4.000 |
| Bacteriocide | 0.010 to 0.400 |
| Solution of caustic soda (30% in water) | 0.050 to 3.000 |
| Corrosion inhibitor | 0.010 to 0.600 |
| Total pp | 100 — |

7. A method as defined in claim 6, wherein the paint includes n different colored base mediums and is formulated from the following components in parts per hundred by weight:

| | |
|---|---|
| Reactive medium emulsion | 30.000 |
| Base medium color 1 | |
| Base medium color 2 | 60.000 |
| Base medium color 3 | |
| Base medium color n | |
| Micronized calcium carbonate | 2.000 |
| Defoaming agent | 0.200 |
| Coalescent | 0.500 |
| Copolymer emulsion containing 50% dispersed solids | 5.000 |
| Solution of bentonite (10% in water) | 0.500 |
| Non-ionic cellulose ether (60% in ethanol) | 0.400 |
| Bacteriocide | 0.200 |
| Solution of caustic soda (30% in water) | 1.000 |
| Corrosion inhibitor | 0.200 |
| Total pp | 100 | the weight ratio of the dispersed phase to the dispersing phase being 0.393:1.

8. A method as defined in claim 6, wherein the paint includes n different colored base mediums and is formulated from the following components in parts per hundred by weight:

| | |
|---|---|
| Water | 20.00 |
| Reactive medium emulsion | 30.000 |
| Base medium color 1 | |
| Base medium color 2 | 40.000 |
| Base medium color 3 | |
| Base medium color n | |
| Micronized calcium carbonate | 2.000 |
| Defoaming agent | 0.200 |
| Coalescent | 0.400 |
| Copolymer emulsion containing 50% dispersed solids | 5.000 |
| Solution of bentonite (10% in water) | 0.500 |
| Non-ionic cellulose ether (60% in ethanol) | 0.400 |
| Bacteriocide | 0.100 |
| Solution of caustic soda (30% in water) | 1.000 |
| Corrosion inhibitor | 0.200 |
| Total pp | 100 | the weight ratio of the dispersed phase to the dispersing phase being about 0.094:1.

9. A method as defined in claim 6, wherein the paint is formulated from the following components in parts per hundred by weight:

| | |
|---|---|
| Reactive medium emulsion | 10.000 |
| White base medium - color 1 | 60.000 |
| Blue base medium - color 2 | 6.600 |
| Grey base medium - color 3 | 5.000 |
| Micronized calcium carbonate | 3.000 |
| Defoaming agent | 0.200 |
| Coalescent | 0.500 |
| Copolymer - styrene acrylic containing 50% dispersed solids | 12.000 |
| Solution of bentonite - 10% in water | 0.800 |
| Solution of polygalactomannan hydroxyalkyl - 60% in ethanol | 0.400 |
| Bacteriocide | 0.200 |
| Solution of caustic soda - 30% in water | 1.000 |
| Corrosion inhibitor | 0.300 |
| Total pp | 100 | the weight ratio of the dispersed phase to the dispersing phase being about 0.166:1.

10. A method as defined in claim 6, wherein the reactive medium emulsion and a plurality of base mediums are prepared separately, each of said base mediums being of a different color, and the base mediums are admixed with the reactive medium in a stir-and-disperse apparatus comprising a vessel having a height adjustable rotor with a speed of rotation variable between 0 and 2,000 min$^{-1}$, and further wherein the paint includes additives and binders.

11. A method as defined in claim 10, wherein the base mediums are admixed with the reactive medium emulsion and the rotor is turned at a speed of at least 800 min$^{-1}$ to produce a strong dispersive action and provide the paint with a speckled finish.

12. A method as defined in claim 10, wherein the base mediums are successively extruded from nozzles having a diameter of 2 to 4 mm and located at or near the surface level of the reactive medium emulsion, and are admixed in succession with the reactive medium emulsion, and wherein the rotor is turned at a low speed of 40 to 80 min$^{-1}$ to produce a laminar blending action and provide the paint with a dropped finish.

13. A method as defined in claim 10, wherein the base medium of the background color is first admixed with the reactive medium emulsion and finely dispersed with the rotor at a turning speed of at least 1,400 min$^{-1}$ to produce a strong dispersive action, and then the remaining base mediums are successively extruded from nozzles having a diameter of 0.3 to 0.8 mm and located at or near the surface level of the reactive medium emulsion and are successively admixed with the reactive medium emulsion with a rotor turning at a low speed of 40 to 80 min$^{-1}$ to produce a laminar blending action and provide the paint with a filiform finish.

14. A method as defined in claim 10, wherein a first base medium is admixed with a portion of the reactive medium emulsion with the rotor turning at a speed of at least 800 min$^{-1}$ to produce a strong dispersive action, the rotor speed is lowered and the reaction is neutralized by the addition of calcium carbonate, and the remaining base mediums are successively admixed with the reactive medium emulsion in the same manner as said first base medium to provide the paint with a speckled finish.

* * * * *